United States Patent Office 3,479,726
Patented Nov. 25, 1969

3,479,726
METHOD OF UNITING A PLURALITY OF FIRST OBJECTS WITH A CORRESPONDING NUMBER OF SECOND OBJECTS
Lars Ingvar Hellborg, Lund, Sweden, assignor, by mesne assignments, to Sobrefina S.A., Fribourg, Switzerland, a company of Switzerland
Filed May 11, 1967, Ser. No. 637,817
Claims priority, application Sweden, May 12, 1966, 6,504/66
Int. Cl. B23p *19/04*
U.S. Cl. 29—429
4 Claims

ABSTRACT OF THE DISCLOSURE

A method of uniting a plurality of first objects with a corresponding number of second objects wherein a spacial configuration of the first objects is brought into confronting relation with the same spacial configuration of the second objects, and the first and second objects are then moved relative to each other to bring them together and effect the union. The spacial configuration of the objects is constituted by an arrangement in two parallel rows, and the objects are brought into their proper positions along the rows by moving them along circular lines.

---

The present invention relates to a method of simultaneously uniting a plurality of first objects with a corresponding number of second objects, which are arranged in a certain characteristic configuration.

The invention has been made in connection with the development of a machine for the manufacture of packaging containers which comprise a plastic lining made from two plastic details which have been deep drawn from flat web-shaped materials and thereupon welded together. Preferably a number of details are manufactured simultaneously in that one has mounted several forming tools in each forming unit, whereby the capacity of the machine is essentially increased. In order to reduce the unavoidable waste of plastic material it is of greatest importance that the forming tools be given a suitable configuration.

The packaging containers also comprise an outer sleeve, preferably made from cardboard, which surrounds and supports the cylindrical side wall of the plastic lining, and which is dimensioned so as to enable it to be made at reasonable costs.

In the referred-to machine the formed plastic details are further arranged to remain in their respective forming cavities during the welding operation; also during the subsequent transportation to a sleeve uniting station, the formed and welded container bodies, i.e. the linings in the finished packaging containers, keep their characteristic configuration.

A primary objective of the present invention is to simplify uniting of the container bodies with the outer sleeves by accomplishing this on a multiple basis. In this particular application of the inventive concept, the sleeves herein define the abovementioned first objects and the container bodies the said second objects. According to the invention the sleeves are first moved to a position straight in front of the container bodies, whereupon all the sleeves in the group simultaneously by an axial movement are brought over upon the container bodies. The invention according to this preferred embodiment is further characterized in that at least certain of the sleeves under its grouping movement are moved to the desired configuration along one or more circular lines.

The invention thus is generally characterized in that the said first objects by a grouping movement—whereunder at least certain of the objects are moved along a first circular line in a plane perpendicular to the axes of the objects—are caused to adopt the same configuration as the said second objects, so that the axes of symmetry of the objects in the two groups will coincide, whereupon the two groups are moved axially towards each other so that all the objects in the first group are simultaneously united with the corresponding objects in the other group.

Figure 1:
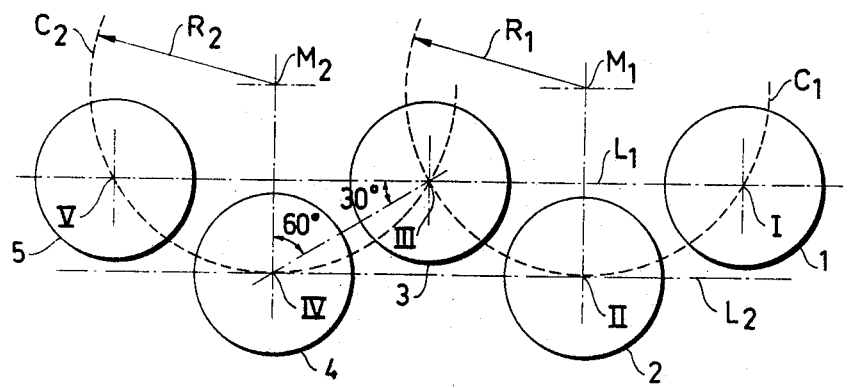
Figure 2:
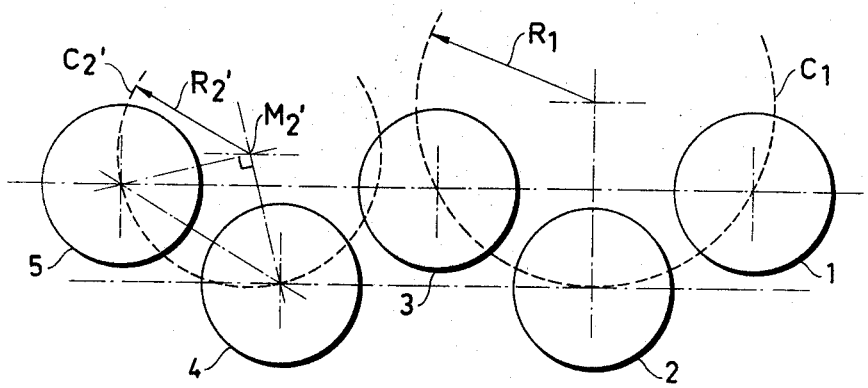
Figure 3:
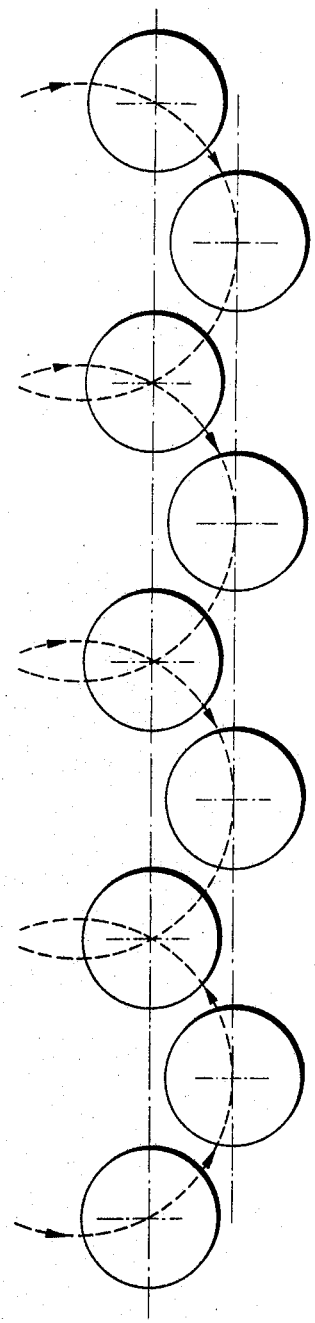
Figure 4:
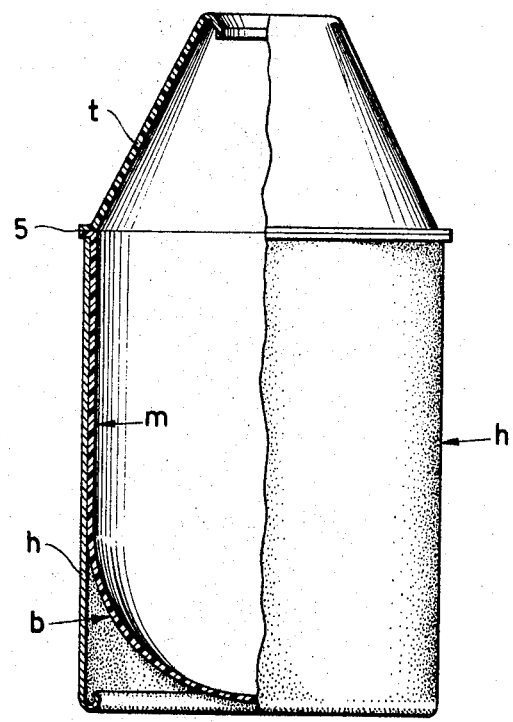
Figure 5:
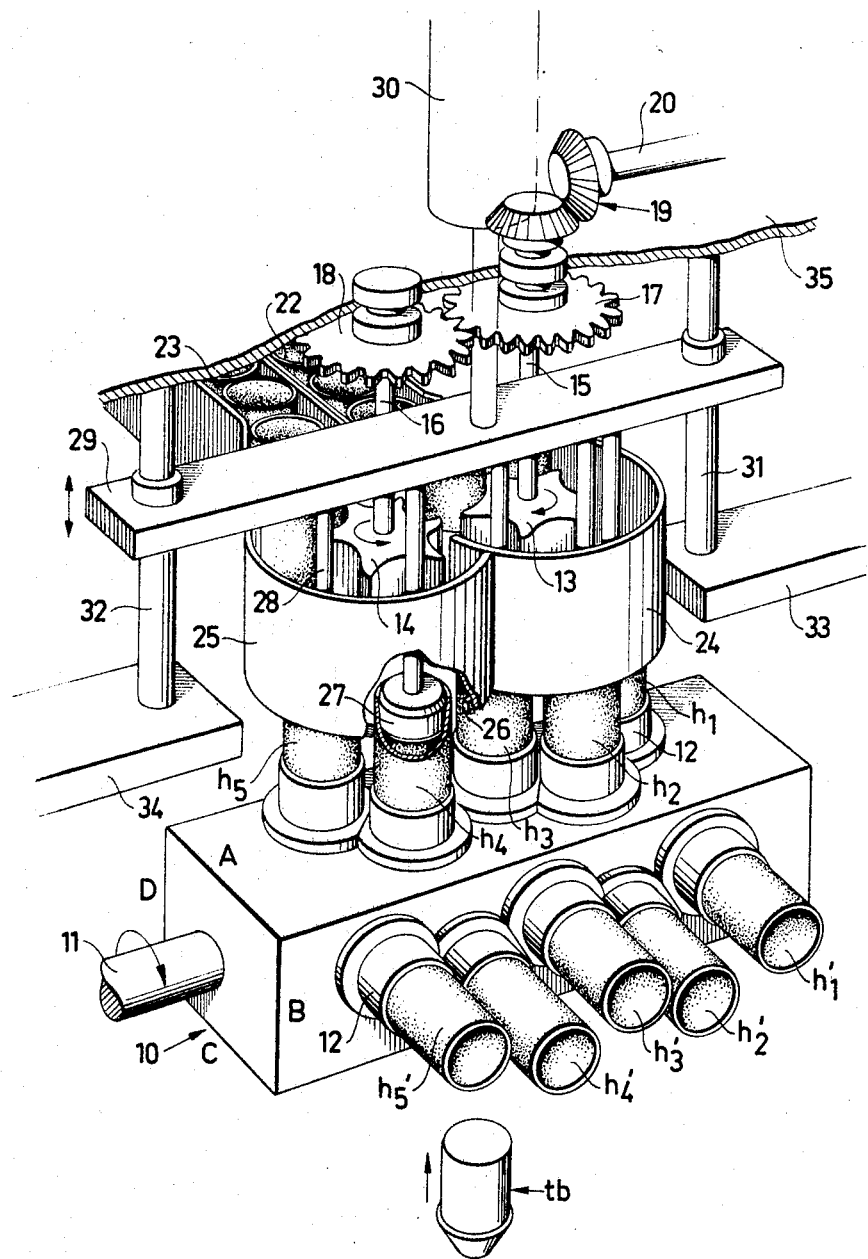

The invention will now be more precisely described with reference to the attached drawings, in which:

FIG. 1 shows some principles of the invention according to a preferred solution of the grouping problem, FIG. 2 shows a second, somewhat modified solution, FIG. 3 shows how the principles of the invention can be applied to a greater number of objects, FIG. 4 is a vertical view, partly in elevation and partly in section of a packaging container for the manufacture of which the invention is intended to be applied, and FIG. 5 is a perspective view of an apparatus in which the principles of the invention are intended to be applied.

In connection with FIG. 1, numerals 1, 2, 3, 4, 5 generally show cylindrical objects as seen from above, e.g. sleeves intended to be brought over upon container bodies of the kind mentioned. The objects will, in the following, for the sake of simplicity be called sleeves, the invention, however, not being limited only to this kind of objects. According to FIG. 1 the sleeves have been arranged in the desired spacial relationship, which is characterized in that the sleeves are grouped on two parallel lines $L_1$ and $L_2$. If the centre points of three sleeves which are adjacent to each other, e.g. the sleeves 3, 4, and 5 are connected by straight lines the centres will define corners of a triangle having the angles 30°, 30°, and 120°. This choice is due to the fact that the least waste of material, when punching out circular blanks from a flat material, is achieved at these particular angle relationships.

According to a well-known mathematic principle three points can define only one circular line. The circular line having the radius $R_1$ and which is defined by the centre points, I, II, III of the sleeves 1, 2, and 3 resp. has in the figure been designated $C_1$. In a similar manner the centre points III, IV, V of the sleeves 3, 4. and 5 resp. in the shown configuration define a circular line $C_2$. That the radius $R_2$ of the circle $C_2$ has the same length as the radius $R_1$ of the circle $C_1$ should not require any further proof to a person slightly skilled in mathematics.

The geometric circumstances have been utilized in accordance with the invention in that three of the sleeves, i.e. the sleeves 1, 2, and 3, when being advanced to their positions in the desired configuration are caused to follow the circular line $C_1$, while the two sleeves 4 and 5 are caused to follow the circular line $C_2$. Herein it will be possible to use rotatable members as conveyors, e.g. star shaped wheels, instead of a more complicated equipment. The centres of rotation of the rotatable members are provided so as to coincide with the centre points $M_1$ and $M_2$ of the circles $C_1$ and $C_2$ respectively.

In FIG. 2 is shown how the sleeves may be advanced to the desired position according to a modified embodiment of the invention. According to this modification the sleeves 1, 2, and 3 are moved along the circular line $C_1$ in the same manner as above described, while the sleeves 4 and 5 are caused to follow the circular line $C_2'$, the radius of which is $$R_2' = R_1 \times \frac{1}{\sqrt{2}}$$

The central point $M_2'$ of the circle $C_2'$ thus will be positioned in the right angle corner of the right angled, isosceles triangle, the hypotenuse of which is defined by the central points IV and V of the sleeves 4 and 5 resp. Also according to this embodiment, star shaped wheels may be used for advance of the sleeves 4 and 5 as will be more clearly described in the following.

Of course it is possible to modify the method of advancing the sleeves also in other ways. If, for instance, the number of objects is only four, one may very well advance three sleeves along a circular line while the fourth sleeve is moved to its position in the desired configuration in any other way. It is also possible to advance the sleeves two and two. If, on the other hand, a large number of objects is to be grouped, the principles of the invention may be utilized in that the number of circular lines is increased, as is illustrated in FIG. 3.

The packaging container shown in FIG. 4 generally consists of three parts, viz. a top portion $t$, a bottom portion $b$ including a cylindrical side wall $m$, and a sleeve $h$. The sleeve $h$ surrounds the cylindrical side wall $m$ and its purpose is to support it against inner and outer stresses. Especially the former ones can be considerable, particularly in the case when the contents of the package is a carbonated liquid. The top portion $t$ and the bottom portion $b$ together form a container body or lining $tb$ and are united by a welded joint $s$.

With reference now to FIG. 5 which illustrates one suitable apparatus in which the novel method in accordance with the invention can be performed, reference number 10 designates in a general manner a revolvable support member which is rotatable in a step-by-step manner around its axis 11. The revolving member can adopt four positions, each step corresponding to a quarter of a revolution of the member. The positions of the revolving member have been designated A, B, C, and D. Each side of the member further shows five holders 12 provided to receive and to bring the sleeves to a position for uniting with the container bodies. Herein the holders have been given a configuration that is identical, though reversed, to the configuration of the forming cavities of the top and the bottom portions in another section of the machine, which section is not shown in the drawing.

In the position designated A, five sleeves $h_1$, $h_2$, $h_3$, $h_4$, and $h_5$ are being pushed down into their holders 12. In position B there are five sleeves $h_1'$, $h_2'$, $h_3'$, $h_4'$, and $h_5'$ in their holders 12. In the lower position, i.e. the position which in FIG. 5 has been designated C, five container bodies $tb$ (only schematically shown) are pushed into those sleeves which by means of the revolving member 10 have been advanced to this position. This simultaneous uniting of the five container bodies with the five sleeves is made possible by the fact that the container bodies and the sleeves have equal configurations. In the fourth position D the finished packaging containers are pushed out of their holders 12.

Numerals 13 and 14 show two six-pointed star shaped bodies which are stepwise rotatable by means of the axles 15 and 16 resp. The movements of the two star shaped bodies 13 and 14 are dependent upon the meshed cog wheels 17 and 18 resp. the diameters of which are proportioned 3:2. Numeral 19 shows a bevel gear-drive which provides at each movement of indexation (each step of the revolving member) together with the drive-shaft 20 to turn the shaft 15 and therewith the cog-body 17 and the star-wheel 13 half a revolution i.e. 180°. The star-body 13 on the other hand will, because of the 3:2 proportions of the meshed cog-wheels 17 and 18 only be turned 120°.

The sleeves which are to be advanced five and five to the desired arrangement are conveyed into chutes 22 and 23 defined by parallel side wall plates. The chutes first are quite straight, the sleeves herein sliding along the bottoms of the chutes. The chutes are thereafter curved at 24 and 25 and open at their bottoms. The side wall plates defining chutes 24 and 25 are shaped so as to establish the configuration of portions of circles. The sleeves are prevented from falling down through the chutes in that the plates 24, 25 are provided with rubber borders turned to the interior of the chutes. The rubber borders are located in the lowermost edges of the chutes. In FIGURE 5 a chute 25 has been partly cut away so that the arrangement of such a rubber border 26 will be apparent.

In FIGURE 5, 27 shows a tool in the form of a plunger provided to push a sleeve $h_4$ down into a holder under the sleeve. Five such tools 27 are provided. They are movable in the axial directions of the sleeves by means of the bars 28 which are mounted on a common, displaceable plate 29. The plate is arranged to be advanced by means of a piston in the power cylinder 30. In FIGURE 5 is shown the position when the sleeves have just been pushed down into their holders 12.

The plate 29 is guided in its reciprocating movement by means of two bars 31 and 32, which are fixedly mounted in the details 33, 34, and 35 of a frame.

Though the mode of operation of the apparatus should be apparent from the above description, the operation will nevertheless be more completely described in the following. A work-cycle is finished when the plunger tools 27 have returned to their upper positions after having pushed down a group of sleeves into the sleeve holders 12. A new work-cycle is started when the revolving member 10 begins to turn a quarter of a revolution in the direction indicated by the arrow. At the same time, and preferably by means of the same driving means which turn the axle 11 the drive shaft 20 turns the six-pointed star-body 13 180° in the direction indicated by the arrow, via the drive gear 19 and shaft 15 whereby three sleeves $h_1$, $h_2$, $h_3$ are advanced along a circular line (corresponding to the circle $C_1$ in FIG. 1) by the pockets formed in the body 13 to their positions in the desired configuration. The six-pointed star-body 14, however, owing to the 3:2 diametral relationship between the cog-wheel 17 and the cog-wheel 18 is turned only 120° in the contrary direction, said second star-body by means of the pockets formed therein hereby advancing the sleeves $h_4$ and $h_5$ to their positions in the configurations along a circular line corresponding to the circle $C_2$ in FIG. 1.

When the star-bodies stop, also the revolving member 10 stops turning. A group of empty sleeve-holders now has been advanced to a position under the grouped sleeves. By means of the piston and cylinder arrangement 30 the plate 29 and therewith also the bars 28 and the plunger tools 27 are pushed downwards, pushing the sleeves $h_1$–$h_5$ down into their respective sleeve holders. The tools 27 then return to their original positions finishing the work-cycle.

The apparatus shown in FIG. 5 can with some slight modifications, be used also for carrying out the alternative solution of the present problem sketched in FIG. 2. The necessary modifications include a diminishing of the star-body 14 and reducing its peaks to only four; a lateral displacement of the shaft 16 for the star-body 14 so as to adopt the position $M_2'$, FIG. 2, and giving the cog-wheels 17 and 18 equal diameters so that the ratio of angularly movement between the two star-bodies 13 and 14 will be 1:1, i.e. each will be turned through 180°.

In conclusion, it is desired to again state that the novel method of uniting a plurality of first objects with a like plurality of second objects is not to be considered as being restricted to the particular objects shown in FIGS. 4 and 5 but rather can be applied equally as well to other objects having configurations different from those which have been illustrated.

Claims to the construction of the apparatus as illustrated in FIG. 5 are contained in a divisional application Ser. No. 814,249 filed Apr. 8, 1969.

I claim:

1. The method of uniting a plurality of first objects with a corresponding number of second objects which comprises the steps of moving the first objects parallel to their axes from a source of supply along a circular line in a plane perpendicular to the axes of the objects to a position wherein a group of said first objects occupy a spacial configuration identical to and confronting the spacial configuration of a group of said second objects and wherein the axes of symmetry of the objects of the two groups coincide, and effecting relative movement of the two groups along their axes towards each other thereby to simultaneously unite the group of said first objects with the group of said second objects.

2. The method as defined in claim 1 wherein a group of three of said first objects are caused to follow along a circular line having a radius defined by the axes of symmetry of a group of three of said second objects in their spacial configuration.

3. The method as defined in claim 1 for uniting five of said first objects with five of said second objects which are arranged with their axes of symmetry crossing two straight parallel lines, one of said lines being crossed by the axes of symmetry of one central and two outer objects and the other line being crossed by the axes of symmetry of two other objects located respectively between said central object and each of said outer objects, wherein a group of three of said first objects are caused to follow along a first circular line having a radius defined by the axes of symmetry of a group of three adjacent second objects in their spacial configuration, and wherein another group of the two remaining adjacent first objects are caused to follow along a second circular line having a radius of the same length as said first circular line, said second circular line being defined by the axes of symmetry of another group of three adjacent second objects in their spacial configuration and which consists of the two second objects in axial alignment respectively with said two remaining first objects and said centrally located second object.

4. The method as defined in claim 1 for uniting five of said first objects with five of said second objects which are arranged with their axes of symmetry crossing two straight parallel lines, one of said lines being crossed by the axes of symmetry of one central and two outer objects and the other line being crossed by the axes of symmetry of two other objects located respectively between said central object and each of said outer objects, wherein a group of three of said first objects are caused to follow a first circular line having a radius defined by the axes of symmerty of a group of three adjacent second objects in their spacial configuration, and wherein another group of the two remaining adjacent first objects are caused to follow along a second circular line having a radius equal to $1/\sqrt{2}$ times the radius of said first circular line, said second circular line being defined by the axes of symmetry of the two second objects in axial alignment respectivley with the said two remaining adjacent first objects.

References Cited
UNITED STATES PATENTS

| | | |
|---|---|---|
| 3,108,363 | 10/1963 | Haumiller. |
| 3,170,231 | 2/1965 | Gleason. |
| 3,195,228 | 7/1965 | Beacham. |
| 3,239,927 | 3/1966 | Hozak _____ 29—429 |

THOMAS H. EAGER, Primary Examiner

U.S. Cl. X.R.

29—208